2,895,218
KNIFE FOR DOMESTIC OR TRADE USE

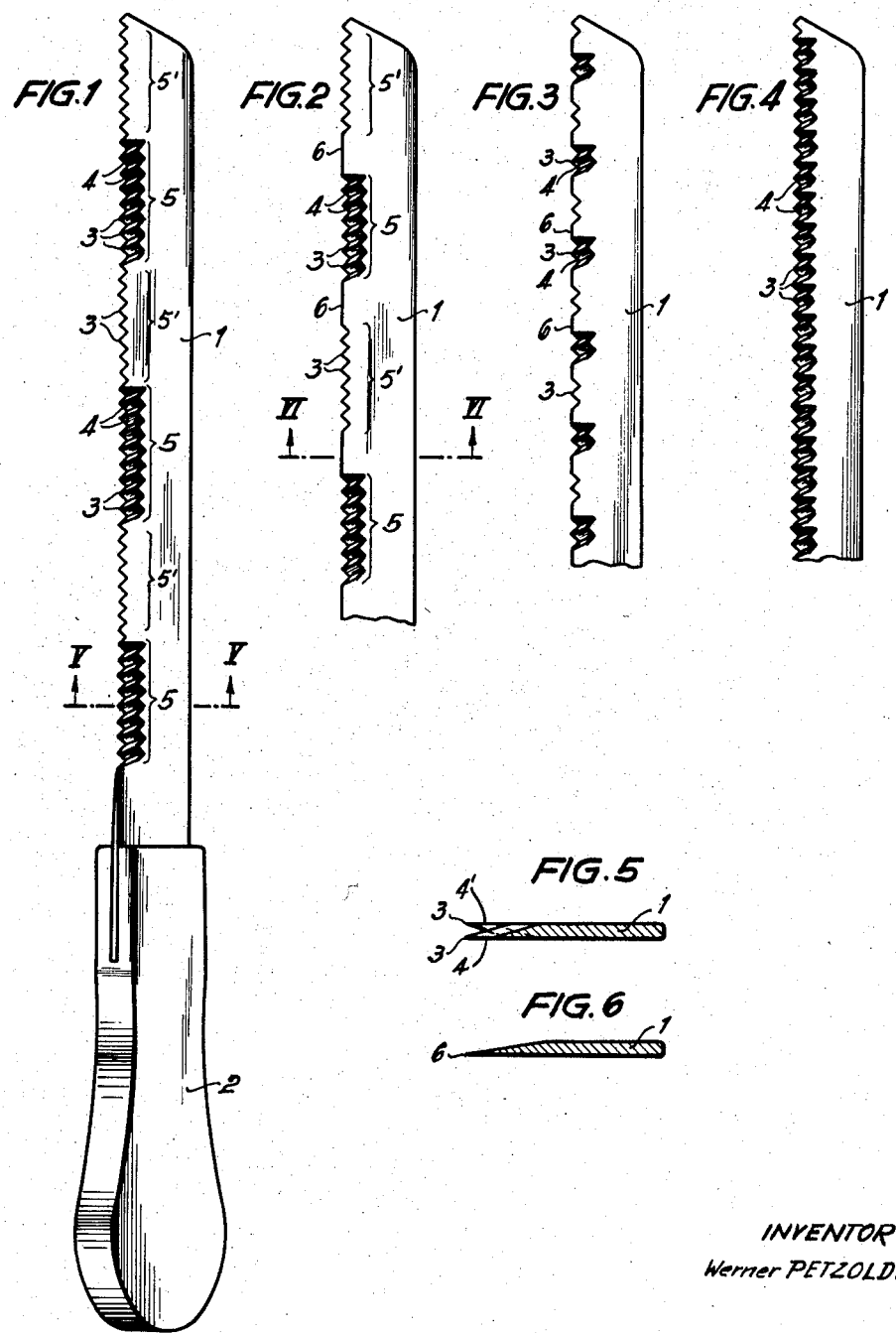

Werner Petzoldt, Solingen-Grafrath, Germany

Application November 21, 1957, Serial No. 697,994

Claims priority, application Germany November 26, 1956

1 Claim. (Cl. 30—355)

The domestic or trade knives hitherto known, which are provided with a serrated cutting edge formed by alternate lateral milled incisions for improving their cutting capacity, are not capable of meeting the imposed requirements especially when it is a question of cutting goods which have been subjected to low-temperature cooling. Such goods offer considerably greater resistance to the cutting edge of a knife than ordinary goods and affect the cutting edge thereof to such an extent that it becomes blunt prematurely.

The object of the invention is to provide a domestic or trade knife having a knife blade with a serrated cutting edge that is capable of cutting particularly low-temperature cooled goods without difficulty and without any detrimental effect on the cutting edge.

The invention consists essentially in this that the serrated cutting edge of the knife forms a plurality of teeth with cutting edges on both sides, said teeth being mutually side set like the teeth of a saw.

Knives with a serrated cutting edge shaped according to the invention possess the properties of a saw with side set teeth and are therefore capable of withstanding much greater stressing than the known knives. They are consequently particularly suitable for cutting low-temperature cooled goods.

According to another construction proposed by the invention the milled incisions forming the cutting edge of the knife blade are arranged in groups in known manner and these groups are longitudinally spaced.

In another construction according to the invention linear cutting edges are disposed parallel to the longitudinal axis of a blade by the terminal ends of the individual cutting teeth or groups of cutting teeth.

Several preferred embodiments of the invention as applied to a knife for domestic or trade use with a serrated cutting edge formed by alternating lateral milled incisions, are illustrated by way of example in the accompanying drawing, in which:

Figs. 1 to 4 show a knife or a portion of a knife blade in plan view looking on one of the broad sides, incorporating different embodiments of the invention;

Fig. 5 is a section on line V—V of Fig. 1, and

Fig. 6 is a section on line VI—VI of Fig. 2.

The knife illustrated in the drawing comprises a knife blade 1 and a handle 2. Indicated at 3 are cutting teeth which are formed by a plurality of alternate laterally milled incisions 4 and 4', see Fig. 5, and which, according to the invention, form a cutting edge on each side, the teeth being side offset like the teeth of a saw.

In the form of construction illustrated in Fig. 1, the milled incisions 4 are assembled in groups 5 and 5' which in turn are longitudinally spaced at regular intervals.

Stated in another manner, the knife blade of the present invention has cutting teeth formed by incisions milled in alternate fashion in both side faces of the blade. The incisions are arranged in such a manner that an incision or a group of incisions in one side face of the blade is immediately followed by a successive incision or group of incisions in the other side face, and so forth.

Hence, the incisions or groups of incisions alternate with each other to form two adjacent rows of cutting teeth or, so to speak, two adjacent interrupted cutting edges. In other words, the teeth are arranged offset like the teeth of a saw, except that the saw teeth are produced by so-called setting whereas the teeth of applicant's knife are produced by alternating milled incisions in both sides of the blade.

In the form of construction illustrated in Fig. 2, straight cutting edges 6, all in a straight line, are provided between the cutting teeth 3 arranged in groups 5 and 5' as mentioned relative to Fig. 1.

In the form of construction illustrated in Figs. 3 and 6, straight cutting edges 6, which also all lie in a straight line, are provided between the individual cutting teeth 3.

In the form of construction illustrated in Fig. 4, the individual cutting teeth 3 alternate from each side of the blade.

The knife can also be provided on the narrow edge remote from the cutting edge provided with teeth according to the invention, with a known cutting edge, for example straight, serrated or undulated, so that the knife can be used, not only for cutting low-temperature cooled goods, but also for cutting ordinary goods, such as meat, sausages, paste articles, and the like.

It will be obvious that the invention is applicable not only to knives with a handle, but also to circular or cutter knives.

I claim:

A cutlery blade comprising an elongated flat blade including a serrated cutting edge, said cutting edge including a plurality of longitudinally spaced groups of teeth, said groups of teeth extending alternately from opposite sides of said blade and terminating in the plane of the opposite side of said blade, the teeth of each group defining a linear cutting edge coplanar with the side of the blade opposite from that side from which the respective group of teeth extends, individual teeth of the separate groups extending from the same side of the blade.

References Cited in the file of this patent

UNITED STATES PATENTS

| | | |
|---|---|---|
| 1,388,547 | Burns | Aug. 23, 1921 |
| 1,819,623 | Rocklin | Aug. 18, 1931 |
| 2,274,188 | Campbell | Feb. 24, 1942 |
| 2,555,735 | Estabrooks | June 5, 1951 |